United States Patent

Beck

[11] 4,319,391
[45] Mar. 16, 1982

[54] METHOD OF CONSTRUCTING THERMOSTATIC VALVE POWER ELEMENT EXTENSION

[75] Inventor: Mark E. Beck, Villa Park, Ill.

[73] Assignee: Eaton Corporation, Cleveland, Ohio

[21] Appl. No.: 170,307

[22] Filed: Jul. 18, 1980

Related U.S. Application Data

[62] Division of Ser. No. 927,254, Jul. 24, 1978, Pat. No. 4,269,350.

[51] Int. Cl.³ .................... B21D 53/00; B21K 29/00; B23P 15/26
[52] U.S. Cl. .................... 29/157.1 R; 29/509; 29/522 R; 29/405; 73/1 F
[58] Field of Search .................... 29/157.1, 405, 509, 29/522 R, 522 A; 73/1; 236/34.5, 34; 251/337

[56] References Cited

U.S. PATENT DOCUMENTS

| | | | |
|---|---|---|---|
| 2,470,667 | 5/1949 | Warrick et al. | 236/34.5 X |
| 2,806,376 | 9/1957 | Wood | 29/405 UX |
| 3,099,878 | 8/1963 | Woods | 29/405 |
| 3,172,602 | 3/1965 | Drapeau | 236/34.5 |
| 3,220,753 | 11/1965 | Kasidas | 29/509 UX |
| 3,228,089 | 1/1966 | Turner | 29/509 X |
| 3,301,433 | 1/1967 | Wade | 29/522 X |
| 3,365,130 | 1/1968 | Kamin | 236/34.5 |
| 3,645,443 | 2/1972 | Willson | 236/34 |
| 3,817,450 | 6/1974 | Mischke | 236/34.5 |
| 3,858,800 | 1/1975 | Wong | 236/34 |

*Primary Examiner*—Charlie T. Moon
*Attorney, Agent, or Firm*—C. H. Grace; R. A. Johnston

[57] ABSTRACT

A thermostatic fluid valve of the type having a temperature responsive power element mounted between upper and lower housing members. A tubular extension member is attached to the lower end of the power element and permits a spring biased valve member to be mounted thereon. The tubular extension member has an inwardly extending flange formed on the upper end and is received over a cylindrically shaped, cold formed boss projecting from the lower end of the power element. The extension member is retained on the lower end of the power element by orbitally staking the boss radially outward to form a cold worked, high strength retaining flange.

3 Claims, 4 Drawing Figures

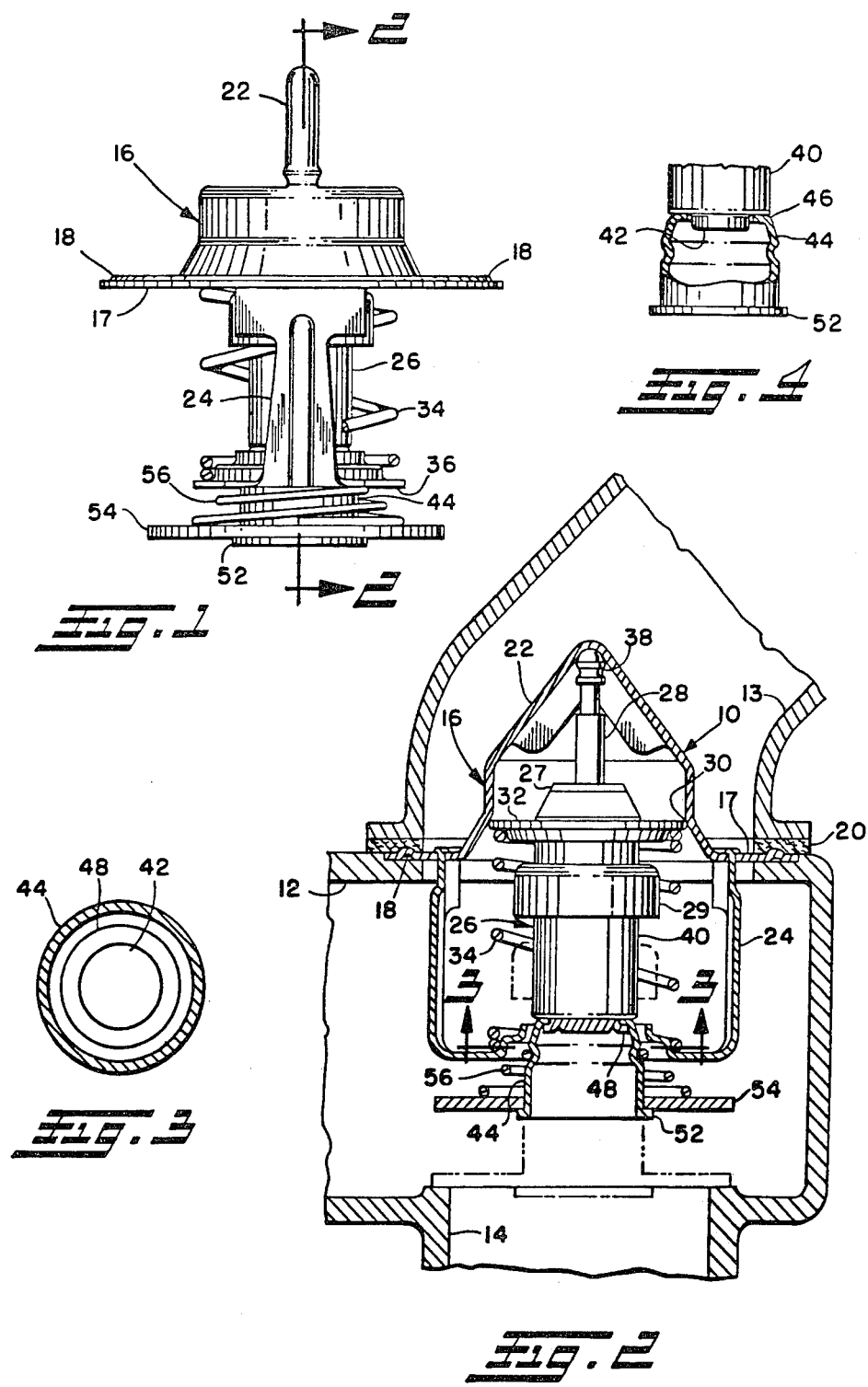

METHOD OF CONSTRUCTING THERMOSTATIC VALVE POWER ELEMENT EXTENSION

This is a division of application Ser. No. 927,254, filed July 24, 1978, now U.S. Pat. No. 4,269,350, issued May 26, 1981.

BACKGROUND OF THE INVENTION

This invention relates to thermostatic water valves for use in internal combustion engine cooling systems and particularly to valves of the type having a bypass valve member mounted on an extension member projecting from the bottom end of the valve power element and includes a method of constructing same.

DESCRIPTION OF THE PRIOR ART

During operation of a cold engine it is desirable to prevent cooling water from flowing through the radiator in order to reduce the time required for the engine to reach an optimal running temperature. As is well known in the art, this is commonly achieved by diverting cooling water from the discharge side of the water pump back to the engine block through a bypass conduit and blocking its return path to the radiator.

Thermostatic water valves are commonly constructed so as to have a bypass valve member extending from the lower housing member of the valve and often utilize a solid, cylindrical extention member welded to the bottom end of a temperature responsive power element. This type of construction requires costly fixturing for the welding operation to achieve high volume production, and also results in the likelihood of damage to the filled wax expansion material from exposure to excessive temperatures. A further cost disadvantage associated with valves of this construction is that a substantially solid extension member is needed for a reliable weld, thus dictating material usage beyond the needs of strength.

SUMMARY OF THE INVENTION

In the present invention a thermostatic water valve is provided of the type having a spring loaded bypass valve member with the bypass valve mounted on a unique, low cost extension member. The invention includes a method for attaching the extension member to the power element. The extension member is tubular and has an inwardly turned flange around its upper end which is secured to the lower end of the temperature responsive power element. A unique aspect of the invention employs orbital staking of an axially extending boss formed on the lower end of the temperature responsive power element so as to deform the boss radially outward thereby providing a cold formed retaining flange which radially and axially retains the tubular extension member to the lower end of the temperature responsive actuator. Material costs are reduced by replacing a solid extension member with one of tubular configuration while assembly costs are reduced by eliminating the costly fixturing required for a weldment.

A further advantage provided by the invention is the relatively high pull-off strength achievable with cold deformation of the metal from the orbital staking since metal is formed with a minimum amount of work-hardening throughout a continuous 360 degree path.

Another feature of the invention is that the extension member is fastened to the wax-filled power element without deforming the body thereof and consequent disruption of the volumetric calibration thereof.

BRIEF DESCRIPTION OF THE DRAWINGS

FIG. 1 is a side elevation view of the invention;

FIG. 2 is a cross-sectional view taken along section lines 2—2 of FIG. 1 showing the invention mounted in cooling water conduits of an internal combustion engine;

FIG. 3 is a partial cross-sectional view taken along section lines 3—3 of FIG. 2 showing an end view of the extension member; and FIG. 4 is a partial cross-sectional view of the extension member before orbital staking.

DETAILED DESCRIPTION

Referring now to FIGS. 1 and 2, there is indicated generally by reference numeral 10 a thermostatic fluid valve mounted in an engine cooling conduit 12 which leads into a hose fitting 13 which in turn flows to the engine radiator, not shown. Communicating with cooling conduit 12 is a by-pass cooling conduit 14, the function of which will be described in detail below.

The thermostatic valve includes an upper housing section indicated generally by reference numeral 16 and has a flanged section 17 with a peripheral rib 18 for insuring fluid tight connection with a sealing gasket 20 clamped between hose fitting 13 and cooling conduit 12. An upper yoke section 22 is integrally formed by the upper housing section 16. A lower housing section 24 is connected to flange section 17 by any suitable means as, for example, riveted tabs, not shown, which may extend through flanged section 17. As shown in FIG. 2, a temperature responsive power element 26 is provided, preferably of the well-known wax filled type which expands upon increases in temperature with an abrupt increase in expansion as temperatures are sensed above a predetermined critical temperature.

The power element 26 includes a guide section 27, an actuator member 28, and a retaining collar 29. The lower end of actuator 28 abuts a sealing diaphragm, not shown, which retains the wax base material within the power element. Expansion of the wax filled material is effective to move the diaphragm upward thereby extending actuator member 28 outward axially relative to the lower end of power element 26.

An inner valve seat 30 is defined by the inner annular surface of upper housing section 16. A disk shaped valve member 32 is attached to power element 26 near its upper end and is movable therewith. A compression spring 34 has its upper end in engagement with valve member 32 and its lower end reacting against a flange portion 36 of lower housing section 24 to bias the valve member 32 upwardly. The upper end 38 of actuator 28 with reference to FIG. 2 is grooved and captured between crimped sides of upper yoke 22. As can be seen in FIG. 1, upper housing section 16 and lower housing section 24 are framelike members which permit free fluid flow therethrough upon unseating of valve member 32 from valve seat 30, as will be described in greater detail below.

Referring to FIG. 2, the lower end of power element 26 includes a cup shaped member 40 which is formed by cold heading from a suitable brass material, preferably an alloy of 87% copper and 17% zinc. The member 40 has provided thereon a cold formed cylindrically shaped boss 42 extending from its lower end, as shown in FIG. 4. The cold heading process imparts residual stresses into cup shaped member 40 which has the effect of sufficiently work hardening the material, thereby raising its effective yield stress. Advantage is taken of the cold headed state of the boss whereby a tubular extension member 44, having an inwardly turned flange 46 around its upper end, is connected to the lower end of power element 26 by radially outward deformation of the boss thereover by an orbital staking process. This unique attachment provides a significantly high pull-off force in the range of about 500 lbs., given a boss 42 diameter of approximately 0.375 in. (9.52 mm) and a tubular extension member 44 wall thickness of about 0.020 in. (5.08 mm) with the tubular extension being formed of a suitable stainless steel. In the presently preferred practice the inwardly turned flanged end of tubular extension 44 is first positioned over boss 42 and then the orbital staking tool (not shown) is rotated and advanced against the transverse face of boss 42 resulting in the formation of a retaining flange 48, as shown by FIG. 2.

As illustrated in FIG. 3, the orbital staking process cold forms metal outward radially to form retaining flange 48 in a continuous 360° path without work hardening the material to a brittle condition, thereby resulting in a mechanical connection having the pull-off strength described above.

The axial force required to be applied to the spinning tool is relatively low compared to the axial force which would be required if the boss were riveted over flange 46. Another unique aspect of orbital staking which has been found particularly desirable is that the material of flanged portion 48 which is cold formed by this process, retains substantially the physical properties of the material before orbital staking. Therefore, the relatively high yield strength imparted to the cylindrical boss 42 during its formation by cold heading is maintained in the retaining flange 48 after assembly, thereby contributing to the high pull-off strength. Another benefit achieved by orbitally staking the extension member 44 to the lower end of the power element 26 is that the volumetric calibration of the wax filled material as contained in a calibrated volume within cup shaped member 40 remains substantially undisturbed since the magnitude of the axial tool force applied to the bottom face of cup 40 is sufficiently low enough to avoid deforming the cup walls.

As illustrated in FIG. 2, tubular extension 44 includes an annular groove 50 formed adjacent its upper end and an outwardly extending retaining flange 52 formed around its lower end. A bypass valve member 54 is slidably received on tubular extension 44 and is maintained in abutment against retaining flange 52 by a preferably conical biasing spring 56 which has its upper end seated in annular groove 50 and its lower end abutting against the top surface of bypass valve member 54.

A novel method of assembling power element 26 to tubular extension member 44 comprises the steps of first cold heading cup 40 from a suitable brass material, filling the cup with a predetermined volume of expansible wax base material, sealing the wax base material with a diaphragm, inserting actuator 28 within guide section 27, and attaching retaining collar 29 over guide 27, actuator 28, and the upper end of cup 40. The power element is preferably calibrated by heating to the critical temperature, limiting axial movement of actuator 28 to the required amount, and crimping the side wall of cup 40 until the wax material completely fills the volume defined by the cup and diaphragm. The tubular extension member 44 having annular groove 50 and inwardly turned flange 46 formed thereon is then placed over cylindrical boss 42 of the calibrated power element and secured to the power element 26 by orbitally staking as described above. This particular method provides an exceptionally strong, vibration resistant connection which insures a reliable support for bypass value member 54.

In operation, during engine start up with the engine block cold, or at substantially ambient temperature, the temperature responsive power element 26 will remain in its unactuated or first position as illustrated in solid outline in FIG. 2. During cold engine operation, valve member 32 remains seated against inner valve seat 30, thereby blocking coolant flow from conduit 12 to the engine radiator. However, as the engine block temperature increases and the coolant temperature is raised above the critical temperature necessary to actuate power element 26, the power element 26 will expand resulting in downward movement with respect to FIG. 2 to a second valve position illustrated in dashed outline with a force sufficient to overcome biasing spring 34. The downward axial displacement of power element 26 is effective to position bypass valve member 54 in sealing abutment with the opening of bypass fluid conduit 14, as indicated by the dashed lines of FIG. 2. Conical biasing spring 56 maintains valve member 54 seated against the opening of bypass conduit 14 as power element 26 continues to expand in response to coolant temperatures above the critical temperature. Tubular extension 44 is free to slide through the centrally located opening in bypass valve member 54 thus preventing damage to the thermostatic valve structure. During normal engine operation, while the power element is actuated to its second position, valve member 32 is spaced downward from inner valve seat 30 thus permitting fluid flow from conduit 12 through the passageways in the valve, hose fitting 13, followed by flow to the engine radiator.

While the invention has been disclosed by reference to certain preferred embodiments, it should be understood that numerous changes could be made without departing from the scope of the inventive concepts disclosed. Accordingly, it is intended that the invention not be limited, except by the language of the following claims.

What is claimed is:

1. A method of attaching a tubular extension member to the bottom end of a temperature responsive power element for use in thermostatic fluid valves, said power element having a cup-shaped hollow body member filled with solid material changeable to a liquid at a predetermined temperature level, which comprises:
   (a) cold heading said hollow body member from a blank of material to include a raised boss extending outward axially from the lower end thereof;
   (b) filling said hollow body member with a predetermined volume of said solid material;
   (c) positioning an actuator member over said solid material as contained in said hollow member;
   (d) sealing said actuator member to said hollow member;
   (e) calibrating the axial expansion of said solid material at said predetermined temperature level by indentation of the walls of said hollow member;
   (f) providing an elongated tubular member with one end thereof having an inwardly extending flange about the periphery thereof;

(g) positioning said flanged end of said tubular member over said boss; and (h) deforming by orbital staking a portion of said boss radially outwardly over said inwardly extending flange of said tubular member.

2. A method of constructing a temperature responsive valve of the type employing a power element having a hollow body filled with solid material changeable to a liquid at a predetermined temperature with expansion of the liquid upon increasing temperature operably driving a force output member for actuating a movable valve member comprising the steps of:

(a) providing a tubular extension with an inwardly extending flange at one end thereof for said body;

(b) deforming a portion of the exterior of said body to provide a generally cylindrical projection extending therefrom;

(c) assembling said tubular member flanged end over said cylindrical projection; and (d) deforming said projection radially outwardly over said flange for retaining said tubular extension on said body.

3. The method recited in claim 2, wherein said step of deforming said projection radially outward comprises orbital staking of said projection.

* * * * *